United States Patent [19]

Todd

[11] 4,279,178
[45] Jul. 21, 1981

[54] OVERDRIVE GEAR ARRANGEMENT

[75] Inventor: William Todd, Duarte, Calif.

[73] Assignee: Todd Overdrive Company, Marine Del Rey, Calif.

[21] Appl. No.: 52,495

[22] Filed: Jun. 27, 1979

[51] Int. Cl.³ ............................ F16H 3/02; F16H 3/08
[52] U.S. Cl. ..................................... 74/745; 74/363; 74/369; 74/375; 74/473 R
[58] Field of Search ................................. 74/362–366, 74/369, 373–375, 745, 473 R; 192/53 F

[56] References Cited

U.S. PATENT DOCUMENTS

| | | | |
|---|---|---|---|
| 2,101,134 | 12/1937 | Fawick | 74/366 X |
| 3,523,598 | 8/1970 | Thom et al. | 192/53 F |
| 4,094,206 | 6/1978 | Sogo et al. | 74/360 |

*Primary Examiner*—Leslie Braun
*Attorney, Agent, or Firm*—Fulwider, Patton, Rieber, Lee & Utecht

[57] ABSTRACT

A power transfer case for a four wheel drive land cruiser is altered to provide overdrive capability. A main drive gear is journaled for rotation about a main drive shaft driven by the vehicle transmission system. The main drive gear includes an axially extending hub section. A direct drive gear is splined onto the main drive shaft, as is an overdrive driving gear. An overdrive idler gear provides a mechanical speed advantage and is engaged with an overdrive driven gear that is journaled for rotation about the main shaft. A shift collar is splined in continuous engagement with the hub section of the main drive gear, and is longitudinally shifted to alternatively effectuate splined engagement with either a direct drive gear or with an overdrive driven gear. The vehicle is provided with four wheel overdrive drive capability without axial relocation of any of the major structural drive line supports or assemblies.

9 Claims, 5 Drawing Figures

OVERDRIVE GEAR ARRANGEMENT

BACKGROUND OF THE INVENTION

1. Field of the Invention

The present invention relates to vehicle transmission overdrive gear arrangements, especially for four wheel drive vehicles.

2. Description of the Prior Art

In the past, several types of transmission overdrive gearing arrangements have been employed. All commercial types of overdrive gear systems have suffered from severe limitations. Some conventional gear arrangements require a separate overdrive gear case assembly which must be interposed in the drive line of an automotive vehicle. This involves longitudinally relocating major transmission or power transfer box assemblies, which in turn necessiates restructuring the frame supports necessary to carry these major gear box and power transfer box assemblies. In one commercially available system, an auxiliary overdrive gear box is provided at the output of the power transfer box, but is connected only to one pair of wheels for a four wheel drive vehicle. As a consequence, the vehicle does not have overdrive capability when operating with all four wheels engaged for four wheel drive operation.

In another conventional device the power transfer block is moved rearward relative to the vehicle transmission so that an auxiliary overdrive gear box can be interposed between the transmission and the power transfer box. This has led to structural defficienies and inadequate mounting support for these major gear arrangements. The power transfer gear box is thereby longitudinally shifted rearward approximately 12 inches, so that new support mounts are necessary. Moreover, with the use of an auxiliary gear box, spacial constraints in the power train mounting, normally very restrictive, are aggravated even further.

SUMMARY OF THE INVENTION

The present invention is a four wheel drive overdrive adapting arrangement for a conventional power transfer case. No auxiliary overdrive case is required. Rather, certain components normally supplied as standard items in the power transfer line are merely replaced with other items according to the invention, but without the necessity of relocating the power transfer case. To the contrary, substitute components are readily employed in an existing gear case to provide an automotive vehicle with overdrive capability. The overdrive gearing employed has full synchromeshed gears with a manual shift. The additional components required can be installed without modification to the power transmission line or to the chassis. The sole exception to necessary modifications is the requirement for a hole in the floor for the overdrive shift lever. The overdrive unit of the invention is basically a bolt on item.

One feature of the overdrive arrangement according to the invention lies in the fact that the main drive gear is not coupled in splined engagement to the main drive shaft, but rather is mounted for rotation relative to the main drive shaft. A direct drive gear is coupled for direct power transmission from the main shaft to the main drive gear. Alternatively, an overdrive driving gear is likewise coupled to the main shaft and transmits power through an idler gear arrangement to an overdrive driven gear journaled for rotation about the main shaft. A shift collar is provided which is in continuous splined engagement with the main drive gear, but which can alternatively be longitudinally moved into engagement with the direct drive gear, when overdrive capability is not desired, or into engagement with the overdrive driven gear. A gear sychronizer is located longitudinally between the overdrive driven gear and the direct drive gear so that the drive line can be easily shifted in synchronized fashion from normal direct drive to overdrive.

The invention may be described with greater clarity and particularly by reference to the accompanying drawings.

DESCRIPTION OF THE EMBODIMENT

Figure 4:
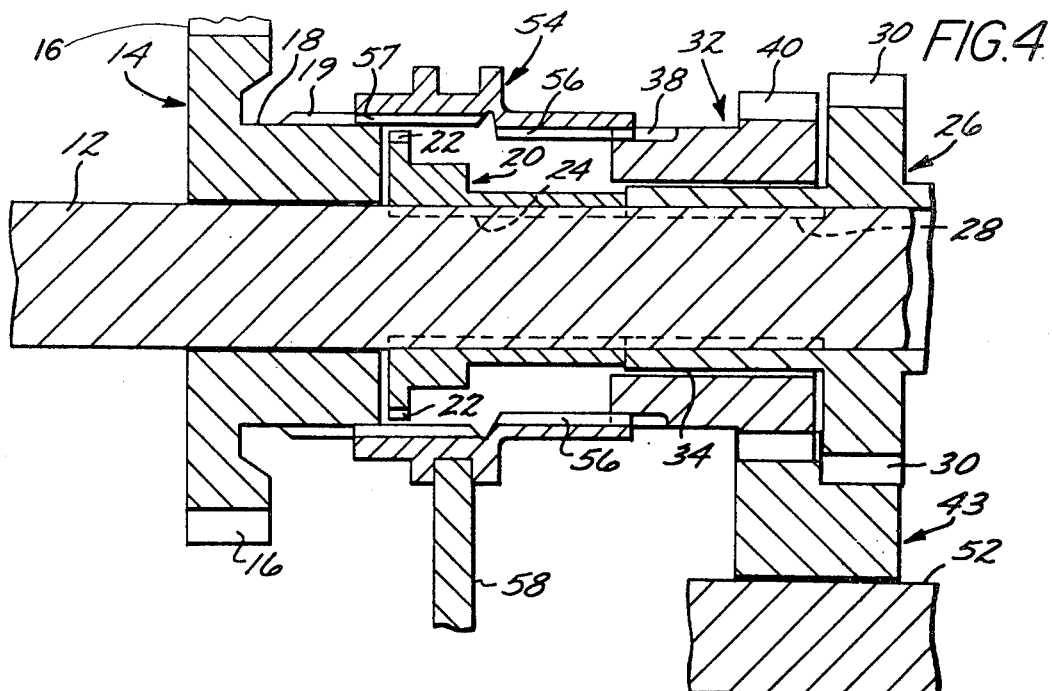
FIG. 4 is a simplified sectional view depicting operation of the gearing arrangement of the embodiment of FIG. 1 in overdrive.
Figure 5:
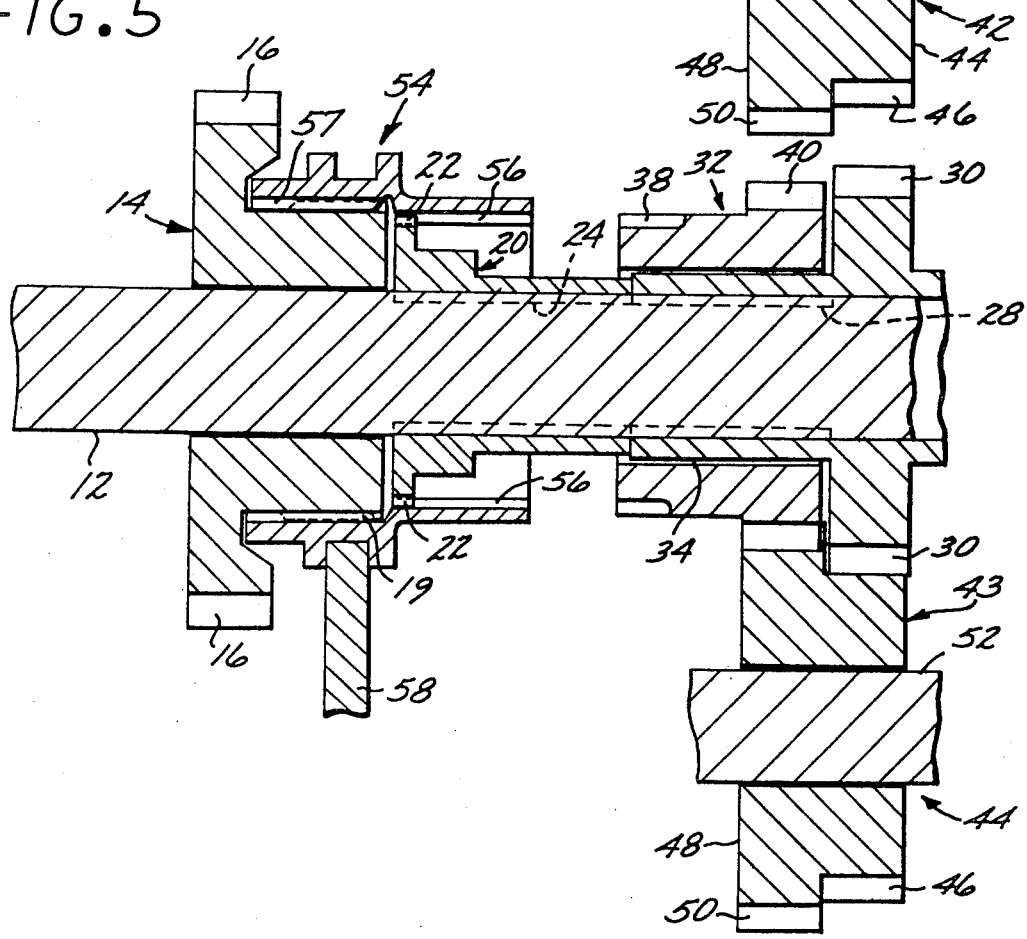
FIG. 5 is a simplified sectional view depicting operation of the gearing arrangement of the embodiment of FIG. 1 in direct drive.

With reference to FIGS. 4 and 5, an overdrive gearing arrangement for a wheeled vehicle power transfer system is depicted. A longitudinally extending splined cylindrical drive shaft 12 is operably coupled to a vehicle transmission drive line (not shown) located to the left of FIGS. 4 and 5. A main drive gear 14 is journaled for rotation about the main drive shaft 12. The gear 14 is a spur gear having teeth indicated at 16 which extend radially outwardly from the main drive shaft 12 and are operably coupled to drive the vehicle axles which in turn power the vehicle wheels. The main drive gear 14 also includes an annular axially extending externally splined hub section 18 with radial splines 19 therein. Bearings, not shown in the simplified views of FIGS. 4 and 5, are interposed between the main drive gear 14 and the main drive shaft 12 so that the main drive gear 14 is coupled to the main drive shaft 12 only through the further gearing of the invention.

A 32 tooth direct drive gear 20, is splined externally with teeth 22 and is interiorly splined at 24 for fixed engagement for rotation with the main drive shaft 12. The direct drive gear 20 is longitudinally displaced from the main drive gear 14, and an overdrive driving gear 26 is further displaced along the main drive shaft 12. The overdrive driving gear 26 is interiorly splined at 28 to the main drive shaft 12, and includes a section of enlarged diameter bearing radially outwardly directed teeth 30. An overdrive driven gear 32 has a smooth interior surface which is journaled upon bearings (not shown) for rotation about an annular sleeve 34 of the overdrive driving gear 26. The overdrive driven gear 32 is externally splined at 38 and includes radially outwardly directed teeth 40. An idler or cluster gear assembly 42 includes an idler gear 43 having a smaller diameter gear section 44 with teeth 46 thereon in meshed engagement with the teeth 30 of the overdrive driving gear 26. The idler gear 43 also includes a gear section 48 of enlarged diameter with teeth 50 thereon which are arranged in meshed engagement with the teeth 40 of the overdrive driven gear 32. The idler gear 43 is splined to an idler axle 52 parallel to the main drive shaft 12. Due to the relative diameters of the gear sections 44 and 48, the gear 43 develops a mechanical speed advantage from the overdrive driving gear 26. The overdrive driven gear 32 is thereby continuously driven at a higher speed than the overdrive driving gear 26.

An annular shift collar 54 is equipped with internally directed splines at 56 of smaller diameter and internal splines 57 at a larger diameter. The shift collar 54 is reciprocally operated longitudinally along the main drive shaft 12 by means of a shifting fork 58 which is coupled to axially move the shift collar 54 relative to the main drive shaft 12. When in the position of FIG. 4, the splines 57 of the shift collar 54 are meshed with the corresponding splines 19 of the main drive gear 14. The splines 56 of the shift collar 54, on the other hand, are meshed with the corresponding splines 38 on the overdrive driven gear 32 and are disengaged from the splines 22 of the direct drive gear 20, when the shift collar is shifted axially to the right into the overdrive position as depicted in FIG. 4. When shifted to the left into the direct drive position, however, as depicted in FIG. 5, the splines 56 of the shift collar 54 are disengaged from the splines 38 of the overdrive driven gear 32, and instead are engaged with the teeth 22 of the direct drive gear 20. Regardless of the position of the shift collar 54, the splines 19 and 57 of the axially extending hub 18 of the main drive gear 14 and the shift collar 54 respectively, are continuously engaged. Likewise, the direct drive gear 20 and the overdrive driven gear 32 rotate continuously, at different speeds, about the main drive shaft 12. The speed of rotation of the main drive gear 14 depends upon with which of the gears, the overdrive driven gear 32 or the direct drive gear 20, the shift collar 54 is engaged.

Figure 1:
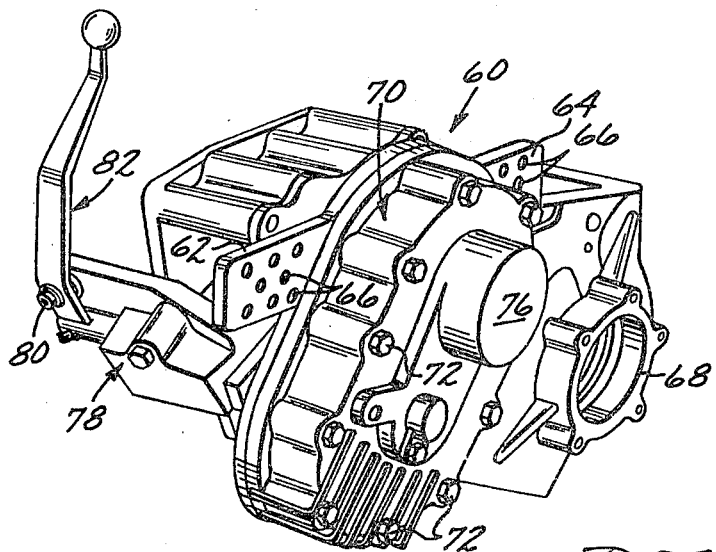
FIG. 1 is a perspective view of a four wheel drive automotive power transfer case, according to the invention.

FIG. 1 depicts a power transfer case 60, supplied as original equipment in a four wheel drive vehicle, such as a Toyota land cruiser, but modified according to the present invention. The power transfer case 60 houses the gear components illustrated in FIGS. 4 and 5, as well as other equipment, as will hereinafter be described. The power transfer case 60 includes oppositely extending transverse mounting flanges 62 and 64, with mounting apertures 66 therein, as depicted in FIG. 1. The transfer case 60 is fastened to the vehicle chassis by means of bolts through these apertures. The gearing in the power transfer case 60 develops a power output through a differential drive shaft (not shown) that extends for engagement with the wheels of the vehicle in journaled arrangement within the longitudinally protruding sleeve 68.

Figure 3:
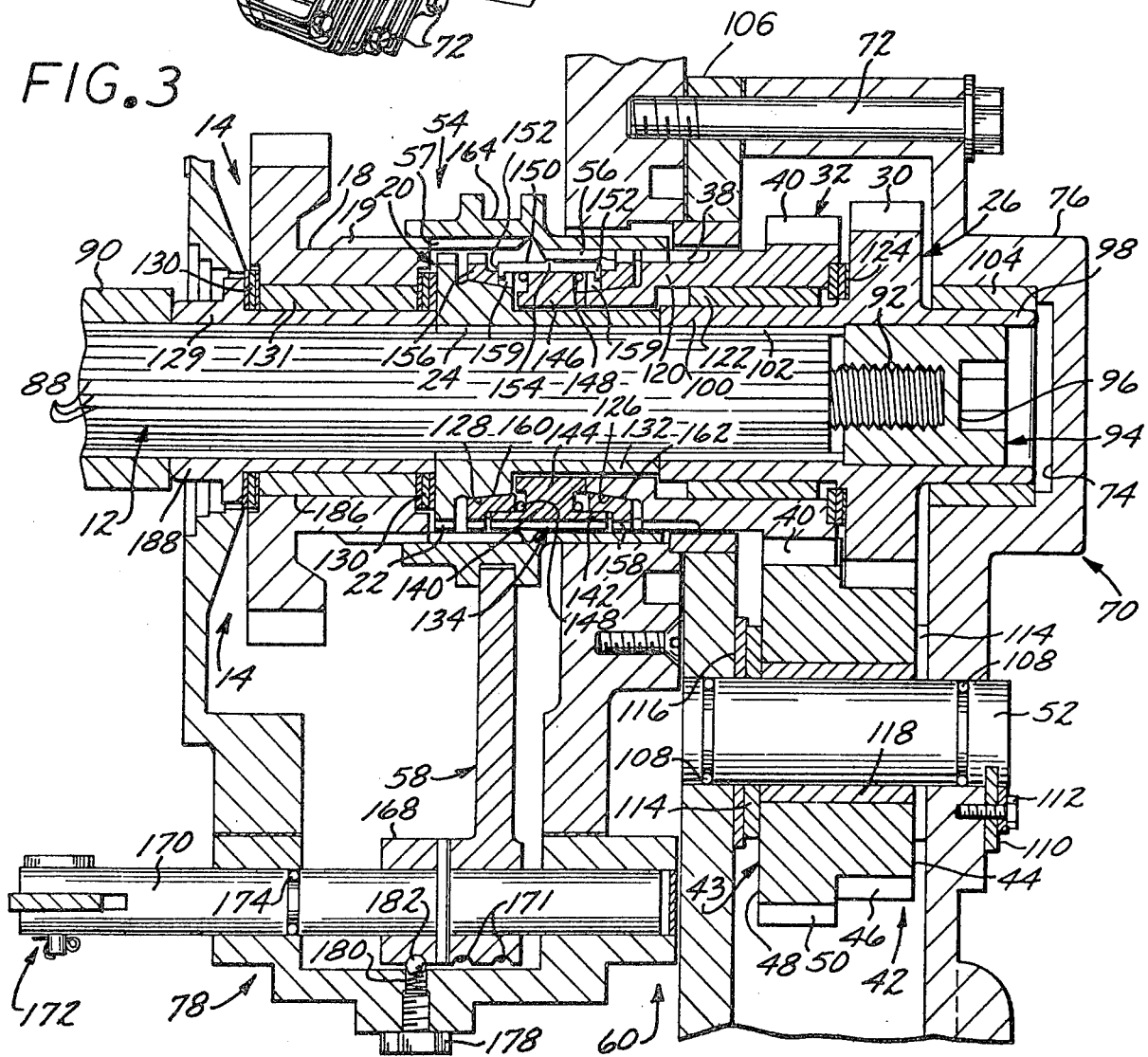
FIG. 3 is a sectional elevational view through the main drive shaft of the power transfer case of FIG. 1.

A concave overdrive case 70 is provided in place of the original flat end plate with which the power transfer case 60 is originally equipped. The overdrive case 70 is secured by bolts 72 to the power transfer case 60. A concave, cylindrical well 74, visible in FIG. 3 is defined by a cylindrical cap 76 extending outwardly from the overdrive case 70.

On the other side of the power transfer case 60, the flat retaining plate supplied as original equipment is removed and a side case 78 is provided in place thereof. The side case 78 includes an aperture which receives a stub axle 80, which serves as a fulcrum for an overdrive shift lever 82, clearly depicted in FIG. 2. The overdrive shift lever 82 terminates at its upper end in a generally spherical shift lever knob 84, and at its lower end in a slot which receives a clevis connecting rod 170 which is connected to move the shift collar 54 longitudinally in the manner described.

The main drive shaft 12 is a longitudinally extending cylindrical shaft, splined about its outer diameter with ten or sixteen splines 88, depending upon the vehicle model year. The main drive shaft 12 emanates from a collar 90 of the vehicle transmission block (not shown) and extends into the power transfer case 60. The main drive shaft 12 includes a threaded axial stud 92 of reduced diameter at its extremity. To this threaded stud 92 is engaged a main shaft extension nut 94, of smooth cylindrical outer configuration, and with a hexagonal recessed well 96 therein, adapted to receive a torquing tool.

The overdrive driving gear 26 is equipped with radially extending teeth 30 and has oppositely extending annular sleeves 98 and 100 integrally formed therewith and extending in opposite longitudinal directions relative to the main shaft 12. The annular sleeves 98 and 100 have smooth outer surfaces. The interior surface of the sleeve 98 is smooth, while the sleeve 100 includes interior splines 102 which are meshed with the splines 88 of the main drive shaft 12. The sleeve 98 turns within an annular bearing ring 104 which centers the sleeve 98 within the axial well 74 in the cup 76 of the overdrive case 70.

The idler assembly 42 includes the idler axle 52 which is mounted for rotation between the transverse end wall of the overdrive case 70 and an aperture in a transverse mounting plate 106 interposed between the overdrive case 70 and the power transfer case 60. O-ring seals 108 are disposed at either end of the idler axle 52, and the axle 52 is held in position by a locking tab 110 upon the exposed surface of the overdrive case 70. The locking tab 110 extends into a channel on one side of the exposed end of the axle 52 and is held in position by a locking screw 112.

Thrust bearings 114 and a gasket 116 maintain the idler gear 43 in the correct longitudinal disposition with the teeth 46 on the smaller diameter section 44 engaged with the teeth 30 of the overdrive driving gear 26. The teeth 50 of the larger diameter idler gear sections 48 are engaged with the teeth 40 of the overdrive driven gear 32. An annular bearing 118 disposed about the idler axle 52 allows the idler gear 43 to rotate upon the idler axle 52.

The main drive gear 14 is disposed between thrust bearings 130 and is mounted for rotation about an annular bearing 186. The bearing 186, in turn, resides upon an annular bearing support 188 that is splined to the main drive shaft 12 adjacent the transmission housing collar 90. The main drive gear 14 is thereby held longitudinally immobile relative to the main drive shaft 12, but rotatable relative thereto.

The overdrive driven gear 32 has an annular collar 120 which has external splines 38 adapted for engagement with the splines 56 of the shift collar 54. The overdrive driven gear 32 rides in rotation about the sleeve 100 of the overdrive driving gear 26 upon an annular bearing 122 interposed therebetween. A ring-shaped thrust bearing 124 reduces friction between the transverse facing surfaces of the overdrive driving gear 26 and the overdrive driven gear 32.

At the extremity of the collar 120 of the overdrive driven gear 32 directed toward the main drive gear 14 there is an outwardly facing, sloping frusto-conical inclined friction engaging surface 126. Similarly, the direct drive gear 20 includes an outwardly facing, inclined frictional engaging surface 128, also of frustoconical configuration, but sloped toward the cap 76 of the overdrive case 70. The direct drive gear 20 is equipped with splines 24 that are interengaged with the splines 88 of the main drive shaft 12. The direct drive gear 20 is separated from the hub 18 of the main drive gear 14 by a thrust bearing 130. From the thrust bearing 130, the direct drive gear 20 extends toward the cap 76 of the overdrive case 70 in an annular sleeve 132. The extremity of the collar 120 of the overdrive driven gear 32 bearing the frictional engaging surface 126 is coaxial relative to the sleeve-like section 132 of the direct drive gear 20, and is rotatable relative thereto.

A gear synchronizing assembly 134 is depicted in FIG. 3 and is located radially outwardly from the sleeve 132 of the direct drive gear 20 and longitudinally between the teeth 22 of the direct drive gear 20 and the splines 38 of the overdrive driven gear 32. The gear synchronizer assembly 134 includes an annular synchro hub 140 having a relatively wide, longitudinally extending rim 142, a narrower connecting neck 144, and a radially interior base 146. At the neck 144 the reduced cross section defines annular channels within which circular radially outwardly biased snap rings 148 reside. Three longitudinal channels are defined in the outer surface of the rim 142 of the sychro hub 140, within which narrow, longitudinally disposed dogs 150 lie. The dogs 150 are linear metal pins with radially inwardly turned ends 152. The dogs 150 have protrusions 154 on their outer surfaces which coact in frictional engagement with the inner surface of the shift collar 54. The dogs 150 are biased radially outwardly by the compressed snap rings 148 and are longitudinally reciprocal in the channels in the rim 142 of the synchro hub 140.

Annular synchro rings 156 and 158 are mounted on longitudinally opposite sides of the synchro hub 140. The synchro ring 156 has a contact surface 160 for frictional engagement with the corresponding frusto conical contact surface 128 of the direct drive gear 20. The synchro ring 158 likewise has a contact surface 162 for frictional engagement with the contact surface 126 of the overdrive driven gear 32. Longitudinally extending slots 159 are defined in the edges of the synchro rings 156 and 158 facing the ends 152 of the dogs 150 and facing the synchro hub 140. The outer surfaces of the synchro hub 140 and the synchro rings 156 and 158 are splined for engagement with the splines 56 of the shift collar 54. Longitudinal movement of the dogs 150 within the channels in the rim 142 will carry the dogs 150 in one longitudinal direction or the other to alternatively lock one of the selected synchro rings 156 or 158 to the synchro hub 140 to the exclusion of the other synchro ring. The dogs 150 thereby form a catch mechanism, and are coupled by frictional engagement at their protrusions 154 to the shift collar 54 for longitudinal movement therewith.

The shift collar 54 includes a section of larger diameter having the inwardly directed splines 57 which are engageable with the corresponding splines 19 on the longitudinal extended hub section 18 of the main drive gear 14. The splines 57 of the shift collar 54 and the mating splines 19 of the main drive gear 14 are always engaged whatever the position of adjustment of the connecting rod 170. The shift collar 54 includes an outer annular channel 165 which is coupled and longitudinally restricted in movement by the shifting fork 58. The shifting fork 58 includes legs which pass on either side of the shift collar 44 and reside within the channel 164. At its radially outwardly extending extremity the shifting fork 58 terminates in a longitudinally directed sleeve 168 having a longitudinally extending circular bore therethrough. On its outward surface, relative to the main shaft 12, the sleeve 168 includes a plurality of detents 171.

Through the lateral walls of the case 78 there is a longitudinal bore parallel to the main drive shaft 12 and adapted to receive a cylindrical coupling rod 170 having a clevis 172 at its exposed end. The coupling rod 170 extends into the bore in the walls of the side case 78 where an O-ring seal 174 ensures liquid tight sealing engagement. In the outwardly directed face of the side case 78 there is a radial bore which is tapped to receive a threaded adjustment screw 178. The adjustment screw 178 acts upon a compressed coil spring 180 to vary the biasing force directed inwardly toward the coupling rod 170 on a detent sphere 182. Engagement or disengagement of the adjustment screw 178 will alter the biasing force so that manipulation of the overdrive shift lever 82 can be moved, but also so that the detent sphere 182 will seat in one of the detent depressions 171 and hold the shifting fork 58 longitudinally immobile until the handle 82 is again manipulated.

Figure 2:
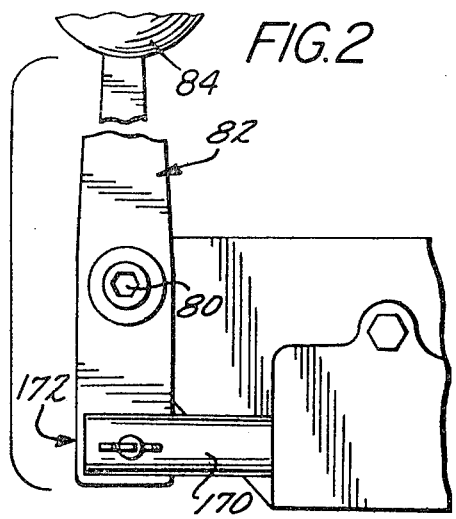
FIG. 2 is a detail view of the overdrive gear shift lever employed in the embodiment of FIG. 1.

With reference to FIGS. 1 and 2, the shift lever 82 may be manually grasped by the knob 84 and moved about the fulcrum pin 80. The connecting rod 170 is moved longitudinally within the longitudinal bore in the side case 78, illustrated in FIG. 3, by force transmitted through the clevis connection 172. Such rotation of the shift lever 82 and longitudinal reciprocation of the connecting rod 170 acts through the shifting fork 58 to adjust selectively the longitudinal position of the shift collar 54 relative to the main drive shaft 12. The shifting fork 58 will assume a longitudinal positon as determined by the detent action of the sphere 182 in the depressions 171.

In the operation of the invention a counterclockwise rotation of the shifting lever 82 from the position depicted in FIG. 2 will bring the gear arrangement of the invention into an overdrive power transmission condition. Counterclockwise rotation of the shift lever 82 forces the connecting rod 170 rearward to the position indicated in FIG. 3. This longitudinal reciprocation is transmitted through the shifting fork 58 to the shift collar 54. The splined interior surface of the shift collar 54 acts upon the protruberances 154 of the dogs 150 and carries them rearwardly within the channels defined in the syncho hub 140 to force the right hand ends 152 of the dogs 150 into abutment with the synchro ring 158. This forces the synchro ring 158 rearwardly and increases the frictional contact between the surface 162 thereof and the corresponding frictional engagement surface 126 of the overdrive driven gear 32. The causes the synchro ring 158 to begin to rotate with the overdrive driven gear 32, which rotates continuously due to the interconnection between the main drive shaft 12, the overdrive driving gear 26, the idler gear 43, and the overdrive driven gear 32. As the synchro ring 158 begins to rotate, the ends 152 of the dogs 150 will shortly fall into registration with the longitudinal slots 159 in the synchro ring 158. This catch mechanism locks the synchro hub 140 and synchro ring 158 in rotation together, and allows the splines 56 of the shift collar 54 to engage with the splines of the synchro ring 158, and subsequently the splines 38 of the overdrive driven gear 32. When this occurs, the higher speed derived from the rotating main drive shaft 12, as transmitted through the idler assembly 42, is carried to the overdrive driven gear 32, through the shift collar 54 to the main drive gear 14.

Conversely, when the shift handle 82 is rotated clockwise from the position of FIG. 2, the connecting rod 170 is drawn to the left from the position depicted in FIG. 3. The shifting fork 58 carries the shift collar 54 to the left, carrying with it the dogs 150 by virtue of the frictional contact of the protuberances 154 with the interior surface of the shift collar 54. When the shift handle 82 is rotated sufficiently, the detent sphere 182 will lie in registration with the center of the detent 171. In this position the dogs 150 do not engage either the synchro ring 156 or the synchro ring 158, and as a result neither the splines 38 of the overdrive driven gear 32, nor the splines 22 of the direct drive gear 20 are engaged with the shift collar 54. In this neutral position no power is transmitted to the shift collar 54.

Continued clockwise rotation of the shift lever 82 from the position of FIG. 2 brings the shift collar 54 further forward carrying the left hand ends 152 of the dogs 150, as viewed in FIG. 3, into abutment with the synchro ring 156. As the ends 152 of the dogs 150 are brought to bear against the synchro ring 156, frictional engagement between the surface 128 of the direct drive gear 20 and the frictional engaging surface 160 of the synchro ring 156 is increased. As this frictional engagement increases, the synchro ring 156 begins to rotate with the direct drive gear 20 and the dogs 150 are ultimately allowed to move into registration with the slots 159 in the synchro ring 156. This allows the shift collar 54 to move further to the left, as viewed in FIG. 3, ultimately to the direct drive position with the splines 56 of the shift collar engaged with the splines 22 of the direct drive gear 20, as depicted diagrammatically in FIG. 5. While in this condition, the power transfer gear train depicted transmits power from the main drive shaft 12 through the direct drive gear 20 and the shift collar 54 engaged therewith to the main drive gear 14.

It should be noted that the modification of an otherwise conventional four wheel drive power transfer case according to the present invention is achieved without altering the longitudinal position of the main drive shaft 12, or the longitudinal position of the power transfer case 60. The only changes which are required to the conventional power transfer case 60 include the internal gears and other mechanisms as described, in place of factory supply parts. The power transfer case 60 is further modified by the addition of the overdrive case 70 and the side case 78 with the connection to the overdrive shift handle 82. A hole must be bored in the floor of the vehicle to receive the overdrive gear shift lever 82. This lever is thus located about seven inches behind and offset from the transmission gear shift lever (not shown) about five inches in a conventional floor mounted gear shift arrangement.

Undoubtedly, numerous variations and modifications of the overdrive gearing arrangement according to the invention will become readily apparent to those familiar with overdrive transmission systems. Accordingly, the scope of the invention should not be considered as limited to the specific embodiment depicted in the drawings, but rather is defined in the claims appended hereto.

I claim:

1. In an automotive drive line power transfer case for four-wheel drive vehicle including a splined main drive shaft coupled to and driven from a vehicle transmission coupled to transmit power to four wheels of the vehicle, an overdrive adapter gear arrangement comprising:
   a bearing having an interiorally splined bearing support and having a smooth outer surface positioned on said main drive shaft proximate to the coupling of said main drive shaft to said vehicle transmission,
   a main drive gear journaled for rotation upon said bearing and having an externally toothed section coupled to drive said four wheels and an externally splined hub section extending axially and rearwardly, relative to said vehicle transmission,
   a direct drive gear internally splined to said main drive shaft for rotation therewith and longitudinally displaced rearwardly from said axially extending hub section of said main drive gear and having external splines thereon,
   an overdrive driving gear internally splined to said main drive shaft for rotation therewith and longitudinally displaced rearwardly from said direct drive gear and from said axially extended hub section of said main drive gear and including a forward sleeve with a smooth outer surface, a section with externally directed idler engaging teeth thereon located rearwardly of said forward sleeve, and a rearward sleeve located rearwardly from said section with externally directed idler engaging teeth and remote from said main drive gear supported upon said main drive shaft,
   an encircling bearing disposed about said rearward sleeve of said overdrive driving gear,
   bearing means disposed about said forward sleeve of said overdrive driving gear,
   an overdrive driven gear having externally directed idler engaging teeth thereon and journaled for rotation upon said bearing means for rotation about said main drive shaft and longitudinally displaced rearwardly from said direct drive gear and from said axially extended hub section of said main drive gear and displaced forwardly from said idler engaging teeth of said overdrive driving gear,
   idler gear means disposed upon an idler shaft mounted in said transfer case parallel to said main drive shaft and having a forwardly located toothed section meshed with said idler engaging teeth of said overdrive driven gear and a rearwardly located toothed section meshed with said idler engaging teeth of said overdrive driving gear for providing a mechanical speed advantage from said overdrive driving gear to said overdrive driven gear, and
   an internally splined shift collar means disposed about said main drive shaft in continuous splined engagement with said external splines of said hub section of said main drive gear and longitudinally reciprocal rearwardly for engagement with said overdrive driven gear and longitudinally reciprocal forwardly for alternative engagement with said direct drive gear.

2. The improved automotive drive line power transfer case of claim 1 further comprising gear synchronizing means for coupling said shift collar alternatively to one of said direct drive gear and said overdrive driven gear, including an annular synchro hub mounted for rotation about said main drive shaft and externally splined and engaged with said shift collar, and annular synhro ring means at opposite ends of said synchro hub for frictionally engaging said synchro hub alternatively with one of said direct drive and overdrive driven gears.

3. The improved automotive drive line power transfer case of claim 2 further comprising a radially extending, longitudinally reciprocal connector coupled to said shift collar, a side cover plate with a concave recess therein to rceive said reciprocal connector and attached to said power transfer case and having an aperture therethrough, an overdrive shift lever rotatably connected at a fulcrum to said cover plate, and a connecting rod for coupling said radial extremity of said reciprocal connector to said overdrive shift lever at an attachment displaced from said fulcrum.

4. The improved automotive drive line power transfer case of claim 1 further comprising a case cap attached to said power transfer case with an axial concave recess therein to receive and support said encircling bearing about said sleeve of said overdrive driving gear remote from said main drive shaft, and with means for supporting said idler means.

5. An overdrive gearing arrangement in a wheeled vehicle power transfer system comprising:
 a main drive shaft assembly operably coupled to a vehicle transmission drive line,
 a main drive gear journaled for rotation upon said main drive shaft assembly proximate to the coupling of said main drive shaft assembly to said vehicle transmission drive line, said main drive gear being coupled to drive the vehicle wheels, and having a hub section with external splines thereon extending axially and rearwardly, relative to said vehicle transmission drive line,
 a direct drive gear secured on said main drive shaft assembly for rotation therewith and longitudinally displaced rearwardly from said axially extending hub section of said main drive gear,
 an overdrive driving gear secured on said main drive shaft assembly for rotation therewith rearwardly from said direct drive gear and from said main drive gear and remote from the coupling of said main drive shaft assembly to said vehicle transmission drive line and having externally directed idler engaging teeth thereon,
 an overdrive driven gear having externally directed idler engaging teeth thereon and journaled for rotation about said main drive shaft assembly and longitudinally displaced rearwardly from said direct drive gear, rearwardly from said axially extending hub section of said main drive gear, and forwardly from said idler engaging teeth of said overdrive driving gear,
 idler gear means mounted upon an idler shaft parallel to said main drive shaft and having a rearwardly located toothed section meshed with said idler engaging teeth of said overdrive driving gear and a forwardly located toothed section meshed with said idler engaging teeth of said overdrive driven gear for providing a mechanical speed advantage from said overdrive driving gear to said overdrive driven gear, and
 shift collar means disposed about said main drive shaft assembly and having internal splines continuously engaged with said external splines of said hub section of said main drive gear and longitudinally reciprocal rearwardly for engagement with said overdrive driven gear and longitudinally reciprocal forwardly for alternative engagement with said direct drive gear.

6. An overdrive gearing arrangement according to claim 5 further comprising a gear synchronizer for coupling said shift collar alternatively to said direct drive gear and said overdrive driven gear.

7. An overdrive gearing arrangement according to claim 6 further characterized in that said gear synchronizer includes an annular synchro hub rotatably mounted coaxially upon said main drive shaft assembly, and annular synchro rings mounted at opposite ends of said synchro hub,
 one of said synchro rings having a contact surface for frictional engagement with said direct drive gear, the other of said synchro rings having a contact surface for frictional engagement with said overdrive driven gear, and catch means interactive between said synchro hub and said synchro rings to alternatively lock one selected synchro ring to said synchro hub to the exclusion of the other.

8. An overdrive gearing arrangement according to claim 7 further characterized in that longitudinal channels are defined in the outer surface of said synchro hub and corresponding slots are defined in the edges of said synchro rings facing said synchro hub, and said catch means is comprised of a plurality of dogs longitudinally reciprocal in said channels to latch in said slots of an alternative one of said synchro rings and said dogs are carried by said shift collar for longitudinal movement therewith.

9. An overdrive gearing arrangement according to claim 7 further characterized in that said direct drive gear is maintained in splined engagement to said main drive shaft assembly and said shift collar is maintained in splined engagement to said hub section of said main drive gear and is splined for engagement with said synchro hub, and said direct drive gear and said overdrive driven gear are splined to receive said shift collar.

* * * * *